(12) United States Patent
Shiraishi et al.

(10) Patent No.: US 7,235,198 B2
(45) Date of Patent: Jun. 26, 2007

(54) METERING METHOD AND CONTROL APPARATUS FOR INJECTION MOLDING MACHINE

(75) Inventors: Wataru Shiraishi, Yamanashi (JP); Satoshi Takatsugi, Yamanashi (JP); Toshio Ishikuro, Yamanashi (JP); Hiroyasu Asaoka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 391 days.

(21) Appl. No.: 10/702,519

(22) Filed: Nov. 7, 2003

(65) Prior Publication Data

US 2004/0096534 A1 May 20, 2004

(30) Foreign Application Priority Data

Nov. 8, 2002 (JP) ............................ 2002-325435

(51) Int. Cl.
B29C 45/76 (2006.01)
(52) U.S. Cl. ................... 264/40.1; 264/328.1
(58) Field of Classification Search ............... 264/40.1, 264/328.1
See application file for complete search history.

(56) References Cited

U.S. PATENT DOCUMENTS 3,317,962 A * 5/1967 Reynolds ..................... 366/78
4,787,834 A * 11/1988 Neko .......................... 425/145
4,832,883 A * 5/1989 Kato et al. .................. 264/40.1
4,879,077 A * 11/1989 Shimizu et al. ............ 264/40.1
5,002,717 A * 3/1991 Taniguchi ................. 264/328.1
5,679,384 A * 10/1997 Emoto ........................ 425/145

5,756,037 A * 5/1998 Kitamura .................. 264/328.1
2001/0053392 A1* 12/2001 Suganuma et al. .......... 425/145

FOREIGN PATENT DOCUMENTS

| DE | 198 34 086 | 1/2000 |
| EP | 0 893 227 | 1/1999 |
| EP | 0 965 428 | 12/1999 |
| EP | 1 063 073 | 12/2000 |
| JP | 61-010425 | 1/1986 |
| JP | 64-006931 | 1/1989 |
| JP | 02-147312 | 6/1990 |
| JP | 09-029794 | 2/1997 |
| JP | 10-016016 | 1/1998 |
| JP | 11-240052 | 9/1999 |

OTHER PUBLICATIONS

European Search Report in corresponding EP Patent Application No. 03257052.5—2307 dated Mar. 21, 2006.

* cited by examiner

Primary Examiner—Christina Johnson
Assistant Examiner—Monica A Huson
(74) Attorney, Agent, or Firm—Staas & Halsey LLP

(57) ABSTRACT

When a metering process is started, a screw rotates at a preset rotating speed, thereby carrying out back pressure control to keep the pressure of a resin at a preset pressure, and retreats. When the screw is located near a preset metering completion position, the control mode is switched to positioning control for the preset metering completion position, and a screw rotation stop command is outputted. The screw overruns for some distance before its rotation stops after it retreats and stops at the preset metering completion position. A resin quantity for the overrun is corrected to obtain a preset metered resin quantity by reversely rotating the screw by a rotational amount corresponding to the overrun.

3 Claims, 4 Drawing Sheets

METERING METHOD AND CONTROL APPARATUS FOR INJECTION MOLDING MACHINE

BACKGROUND OF THE INVENTION

1. Field of the Invention

The present invention relates to an injection molding machine, and more particularly, to a metering method capable of accurately metering a resin and a control apparatus for the injection molding machine.

2. Description of the Related Art

In an in-line screw-type injection molding machine, a screw in a heating cylinder is rotated to melt and knead a resin material, and the molten resin is supplied under pressure to the distal end portion of the heating cylinder. Pressure control is carried out as the screw retreats. When the screw reaches a preset metering point, its rotation and retreat are stopped, and the resin is metered. In a pre-plasticization-type injection molding machine, a screw is rotated for pre-plasticization, and a molten resin is supplied to the distal end portion of the cylinder. A plunger retreats under the pressure of the resin that is supplied to the distal end portion of the cylinder. When the plunger reaches a preset position, the molten resin is metered. After this metering operation, the screw or plunger is advanced so that the molten resin is injected into a mold to fill it.

In order to enhance the quality of molded parts, variation of the fill of the molten resin in the mold must be reduced.

Injection is carried out after the screw or plunger retreats to the position of the metering point. If the metered molten resin is directly injected into the mold to fill it as this is done, an accurate fill can be obtained, so that the quality of the molded parts can be kept uniform without any variation in the weight of the molded parts. In this case, however, the metered resin quantity changes as an injection process is started after the metering operation is finished, so that an accurate molten resin quantity cannot be injected. Various techniques have been proposed to solve this problem.

In the metering process, the molten resin that is produced as the screw rotates is supplied to the distal end portion of the cylinder. A valve, such as a check valve or check ring, is provided on the distal end of the screw, whereby the molten resin at the distal end portion of the screw can be injected into the mold without flowing backward in the injection process. According to a proposed technique, the molten resin moves between the distal and rear end portions of the screw through the valve during the time interval between the end of the metering operation and the start of the injection. Thus, the metered resin quantity can be prevented from changing, so that the accurately metered resin can be injected.

(a) In the pre-plasticization type injection molding machine, the plunger retreats so that the pressure of the molten resin at the distal end portion of the screw is zero after the metering operation is finished. Thereafter, the plunger is advanced, and the check valve is causes to retreat to close a resin passage from the rear end portion of the cylinder to its distal end portion. Thus, the molten resin can be prevented from flowing backward, so that variation of the metered resin quantity can be eliminated (e.g., Japanese Patent Application Laid-open No. 2-147312).

(b) If the screw retreats to the metering point, in the in-line injection molding machine, its rotation and retreat are stopped. Thereafter, the screw is rotated reversely to lower the resin pressure at the rear end portion of the cylinder so that the check valve retreats to close the resin passage. Injection is started after the resin is sucked back. By doing this, variation of the metered resin quantity can be eliminated (e.g., Japanese Patent Application Laid-open No. 11-240052).

(c) Likewise, the screw is rotated reversely after the metering operation is finished, or the resin is sucked back as the screw is rotated reversely, and the resin passage is closed by means of the check ring. Injection is started thereafter (e.g., Japanese Patent Application Laid-open No. 10-16016).

(d) After the metering operation is finished, moreover, the resin is sucked back, the screw is then rotated reversely, and the resin passage is closed by means of the ring valve. Injection is carried out thereafter (e.g., Japanese Patent Application Laid-open No. 9-29794).

According to the conventional technique described above, fluctuation of the metered resin quantity that is attributable to, for example, a backflow of the molten resin at the distal end portion of the cylinder during the injection can be prevented.

The following is a description of a control technique that ensures an accurate metered resin quantity.

(a) A plurality of sets of back pressure commands and screw rotational frequency commands are prepared, and the combined back pressures and screw rotational frequencies are controlled in association with one another. When the metering process is finished, the screw rotational frequency and the screw retreating speed controlled and adjusted to zero, whereby the metering is made uniform (e.g., Japanese Examined Patent Publication No. 1-26857).

(b) Further, a stable metered resin quantity can be obtained by gradually lowering the screw rotating speed used before the metering operation is stopped with respect to a retreat position of the screw (e.g., Japanese Examined Patent Publication No. 64-6931).

The screw, a motor that rotates the screw, and a transmission mechanism that transmits motor torque to the screw have inertia. If the motor for screw rotation is stopped to interrupt the screw rotation when the screw reaches the position of the metering point, therefore, the screw rotation cannot be stopped in a moment under the influence of the inertia. Thus, the inertia causes the screw and the screw rotating mechanism to overrun. Thereupon, the resin quantity changes correspondingly, so that the metered resin quantity fails to be equal to a preset value. Since this metered resin quantity that causes the overrun is not controlled, it is only apparently stable, and fluctuates actually. In consequence, the actual weight of molded parts varies.

If a high screw rotational frequency is used with the same preset metering completion position, it takes much time to stop the screw, so that the metered resin quantity involves a surplus quantity that is attributable to the overrun. Therefore, the metered resin quantity is liable to increase and may vary depending on the molding conditions. Thus, settling the molding conditions requires an extra hard operation, such as fine adjustment of the preset metering completion position. Further, the aforesaid method in which the rotational frequency of the screw is gradually lowered as the metering completion position is approached requires time. In consequence, the metering process takes too much time.

SUMMARY OF THE INVENTION

A first mode of a metering method for an injection molding machine according to the present invention comprises: obtaining a screw rotational amount after a screw or a plunger retreats up to a preset metering completion position; and reversely rotating the screw by the obtained rotational amount after the rotation of the screw is stopped.

A second mode of the metering method for an injection molding machine according to the present invention comprises: delivering a screw rotation stop command to screw rotation drive means when a screw or a plunger stops after retreating and reaching a preset metering completion position, and measuring the rotational amount of the screw thereafter; and reversely rotating the screw by the measured rotational amount after the rotation of the screw is stopped.

A third mode of the metering method for an injection molding machine according to the present invention comprises: delivering a screw rotation stop command to screw rotation drive means when a screw or a plunger stops after retreating and reaching a preset metering completion position, and measuring and storing the rotational amount of the screw thereafter; and delivering the screw rotation stop command to the screw rotation drive means when the screw or the plunger stops after retreating and reaching the preset metering completion position, in a subsequent metering process, and reversely rotating the screw by the stored rotational amount after the rotation of the screw is stopped.

A control apparatus for an injection molding machine is applied to an in-line injection molding machine, which comprises a screw advancing and retreating motor for advancing and retreating a screw and a screw rotating motor for rotating the screw, and is designed so that the screw rotating motor is rotated in a given direction during metering operation as the screw advancing and retreating motor is driven to cause the screw to retreat to a preset metering completion position.

A first mode of the control apparatus comprises: means for obtaining a rotational amount which represents overrun of the screw during the time from the arrival of the screw at the preset metering completion position to the subsequent deceleration and stop of the screw rotation; and means for driving the screw rotating motor to rotate the screw in a direction opposite to the direction for the metering operation in accordance with the obtained rotational amount.

Further, a second mode of the control apparatus comprises: means for previously setting and storing a rotational amount which represents overrun of the screw during the time from the arrival of the screw at the preset metering completion position to subsequent deceleration and stop of the screw rotation; and means for driving the screw rotating motor to rotate the screw for the stored rotational amount in a direction opposite to the direction for the metering operation after the screw rotation is stopped at the end of the metering operation.

The first and second modes of the control apparatus may assume the following aspects.

The means for rotating the screw in the direction opposite to the direction for the metering operation may reversely rotate the screw immediately after the screw rotation is stopped.

The means for rotating the screw in the direction opposite to the direction for the metering operation may drive the screw rotating motor to rotate the screw at a preset rotating speed in the direction opposite to the direction for the metering operation.

The in-line injection molding machine may be replaced with a plunger-type injection molding machine, the screw advancing and retreating motor for advancing and retreating the screw may be replaced with a plunger advancing and retreating motor for advancing and retreating a plunger, and the plunger may be advanced and retreated in place of the screw by means of the plunger advancing and retreating motor.

According to the present invention, there may be provided a metering method in which fluctuation of a metered resin quantity that is attributable to overrun of screw rotation can be corrected to obtain a more accurate, uniform metered resin quantity, and a control apparatus for an injection molding machine.

BRIEF DESCRIPTION OF THE DRAWINGS

The above and other objects and features of the invention will be more apparent from the ensuing description taken in connection with the accompanying drawings, in which.

DETAILED DESCRIPTION OF THE PREFERRED EMBODIMENTS

Figure 1:
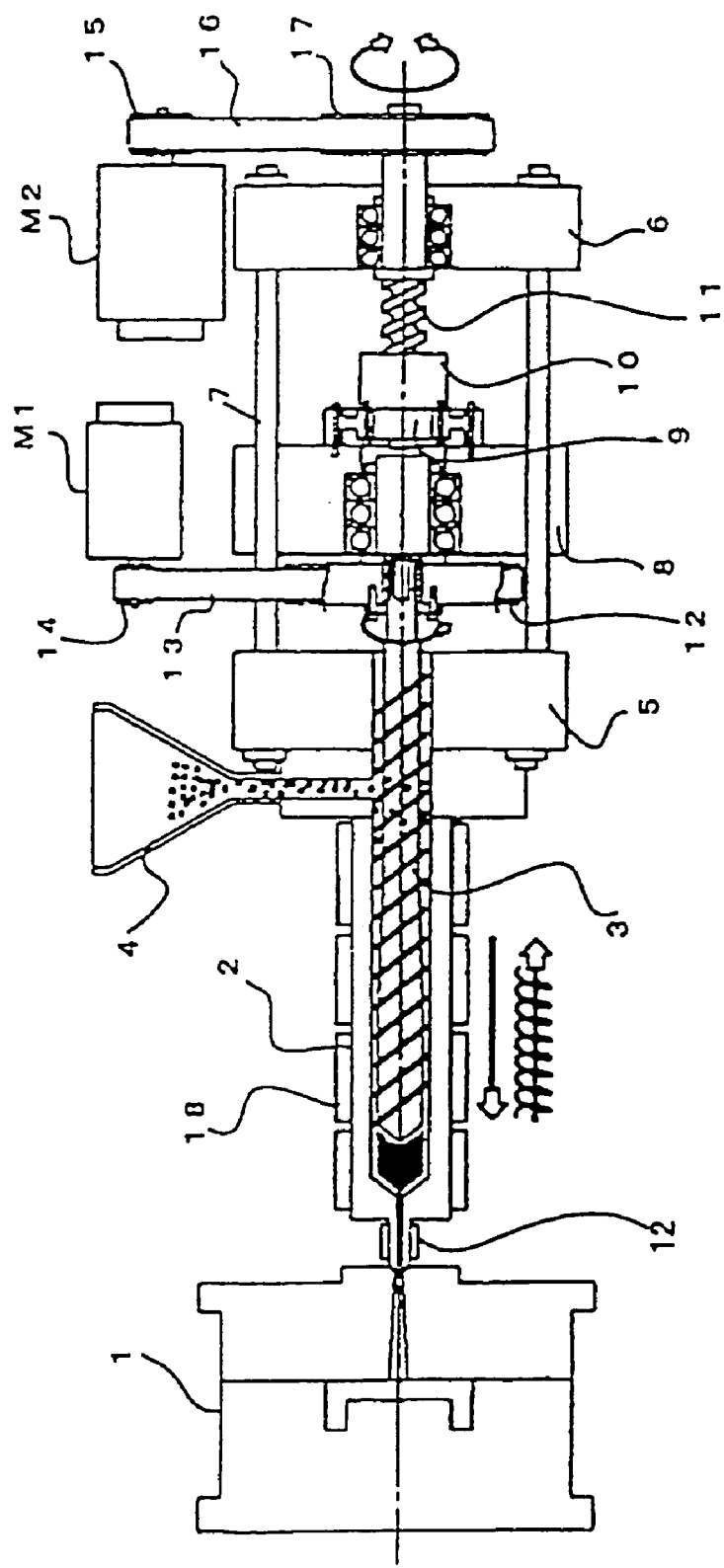
FIG. 1 is a schematic view of an injection mechanism of an injection molding machine to which various embodiments of the invention are applied.

FIG. 1 is a schematic diagram of the injection mechanism part of one example of an in-line type injection molding machine to which the control device of the present invention is applied. In this figure, 1 indicates a metal mold, 2 indicates a cylinder, 3 indicates a screw, 4 indicates a hopper which supplies resin pellets to the interior of the cylinder, 5 indicates a front plate that forms the injection mechanism, and 6 indicates a rear plate. Furthermore, a plurality of guide bars 7 are disposed between the abovementioned front plate 5 and rear plate 6, and a pusher plate 8 is disposed so that this plate can freely move in the forward-rearward direction (left-right direction in the figure) while being guided by these guide bars 7.

The base part of the screw 3 is attached to the abovementioned pusher plate 8 so that the screw 3 is free to rotate, and a driven pulley 12 is attached to this base part. The screw 3 is rotationally driven by a screw rotating servo motor M1 via a driving pulley 14, timing belt 13 and the abovementioned driven pulley 12. Furthermore, the screw rotating servo motor M1 is omitted from the figure; however, this motor is attached to the pusher plate 8 and advances and retreats together with the pusher plate 8.

Furthermore, a ball nut 10 is attached to the pusher plate 8 via a pressure sensor (load cell) 9; a ball screw 11 is screw-engaged with this ball nut 10, and this ball screw 11 is rotationally driven by a screw advancing and retreating servo motor M2 via a driving pulley 15, timing belt 16 and driven pulley 17. As a result, the screw 3 is driven in the axial direction (left-right direction in the figure) via the pusher plate 8.

Figure 2:
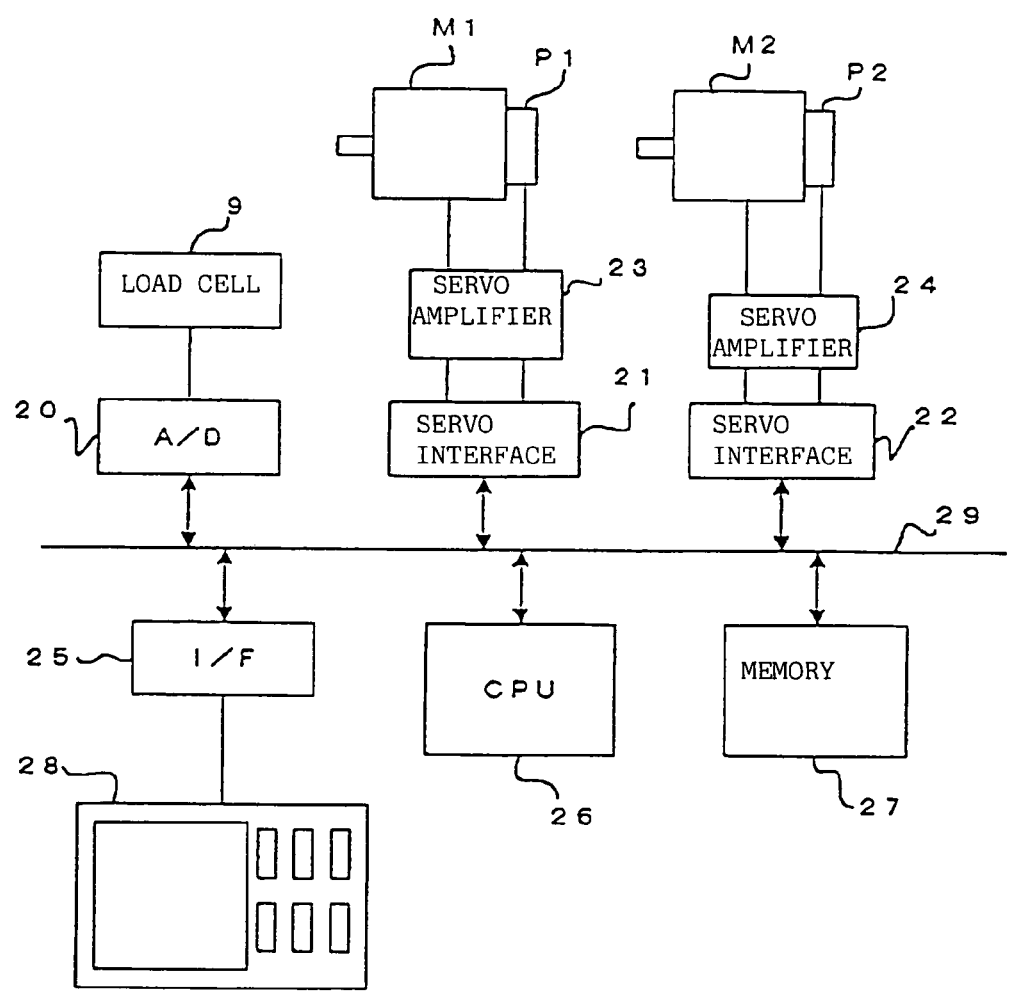
FIG. 2 is a block diagram showing the principal part of a control apparatus according to one embodiment of the invention for controlling the injection molding machine.

FIG. 2 is a block diagram of the essential parts of the control device that controls this injection molding machine; the control device of the present invention is constructed from this control device shown in FIG. 2.

In FIG. 2, the symbol 26 indicates a processor which controls this injection molding machine as a whole; an A/D converter 20 which converts analog signals into digital signals, servo interfaces 21 and 22, an input-output interface 25, and a memory 27 constructed from a ROM, RAM, nonvolatile RAM or the like are connected to this processor via a bus 29. The pressure sensor (load cell) 9 is connected to the A/D converter 20, and servo amplifiers 23 and 24 are respectively connected to the servo interfaces 21 and 22.

The servo motor M1 and a position/speed detector P1 are connected to the servo amplifier 23. The position and rotational speed of the servo motor M1 are detected by the abovementioned position/speed detector P1, so that the amount of rotation and rotational speed of the screw 3 are detected. The servo amplifier 23 receives movement commands issued by the processor 26 during metering via the servo interface 21, and controls the driving of the servo motor M1 by performing feedback control of the speed, and also performing feedback control of the current (torque), in accordance with the actual speed of the servo motor M1 (rotational speed of the screw) that is detected by the position/speed detector P1 and fed back. The present invention is characterized in that control of a rotation amount (or control of position) is performed with a movement command, issued from the processor 26, which has a predetermined rotation amount with the direction reversed with respect to the direction during metering.

Furthermore, the servo motor M2 and a position/speed detector P2 such as an encoder or the like are connected to the servo amplifier 24. The rotational position and rotational speed of the servo motor M2 are detected by this position/speed detector P2, so that the advancing/retreating position and advancing/retreating speed of the screw 3 are detected. The servo amplifier 24 receives position commands or speed commands output by the processor 26 via the servo interface 22, and controls the driving of the servo motor M2 by performing feedback control of the position and/or speed, and also performing feedback control of the current (torque), in accordance with the rotational position and/or actual speed of the servo motor M2 (speed to the screw) that is detected and fed back by the position/speed detector P2. Furthermore, the servo amplifiers 23 and 24 may be constructed from hardware alone such as electrical circuits or the like; in the present embodiment, however, these servo amplifiers are constructed from so-called digital servo amplifiers which are formed by a processor, ROM, RAM or the like, and which control the position, speed, torque and the like of the servo motors by means of software.

A data input-output device 28 comprising display means constructed from a liquid crystal display or CRT is connected to the input-output interface 25, and the setting of various commands, various parameters and the like can be performed by this input-output device 28, so that various set values, the screw rpm, the screw retreat position and the like (described later) can be displayed by the display means.

The abovementioned construction is the same as the construction in a conventional injection molding machine control device; however, this control device differs from a conventional injection molding machine control device in that the device comprises functional means for controlling the resin pressure in the metering process, and performing control so that the retreat of the screw and the rotation of the screw both stop when metering is completed.

Figure 3A:
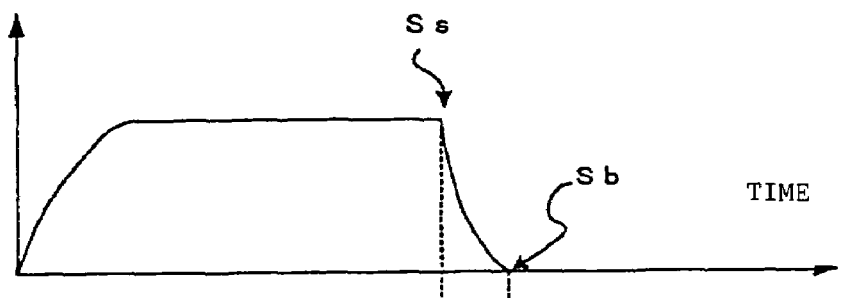
FIGS. 3A and 3B are diagrams illustrating the principle of operation of the invention.
Figure 3B:
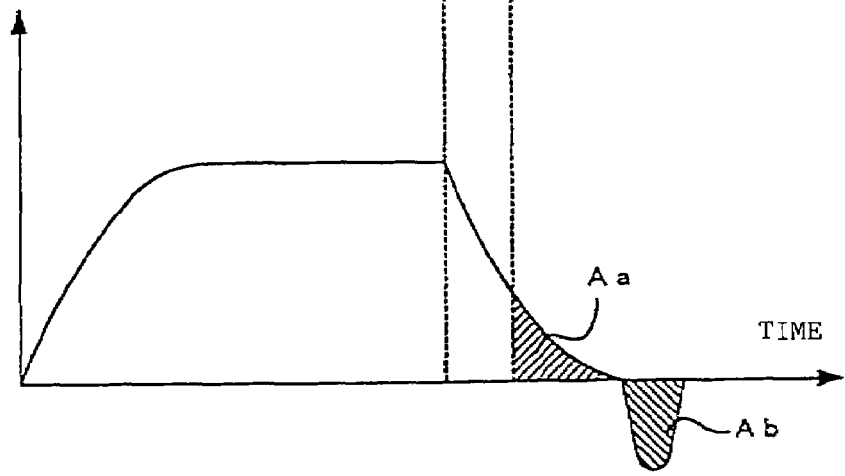

FIGS. 3A and 3B are diagrams illustrating the principle of the present invention. In FIG. 3A, the axes of ordinate and abscissa represent the retreating speed of the screw and time, respectively. In FIG. 3B, the axes of ordinate and abscissa represent the rotating speed of the screw and time, respectively.

When a metering process is started, the screw is accelerated to a preset rotating speed and maintains the preset speed. A molten resin is subjected to back pressure control and kept at a preset back pressure. In consequence, the screw retreats substantially at a constant speed.

When a preset position deviation Ss is reached by a residual movement (position deviation) to a preset metering completion position Sb, the control mode is switched to positioning control for the preset metering completion position Sb, and a screw rotation stop command is outputted. The screw retreating speed is reduced and the screw is situated in the preset metering completion position Sb, whereupon its retreat is stopped. In some cases, the metering process may be divided into a plurality of stages so that the screw rotating speed and screw retreating speed (back pressure) can be changed as the screw is controlled.

If the rotation of the screw is stopped in response to the screw rotation stop command, on the other hand, the screw rotation cannot stop immediately, owing to the respective inertias of a motor, screw, screw rotation drive mechanism, etc. Thus, the screw rotation fails to stop when the screw retreat stops, as shown in FIG. 3B. In other words, the screw overruns before its rotation stops. Accordingly, the resin is supposed to be overly metered by a rotational amount Aa corresponding to the overrun. If this quantity is injected, it is larger than a preset metered resin quantity. Since the rotational amount Aa corresponding to the overrun is not controlled, moreover, it may possibly vary with every metering process, thereby causing variation in the weight of molded parts.

According to the present invention, therefore, the rotational amount Aa corresponding to the overrun is measured, and the screw is rotated reversely by a amount Ab corresponding to the rotational amount Aa. In consequence, the molten resin that is accumulated and compressed on the distal end portion of the screw of the injection cylinder is refluxed toward the screw by an amount corresponding to the reverse rotational amount Ab or the overrun rotational amount Aa. When injection is started, the surplus resin quantity that is attributable to the overrun is corrected by the reverse rotation, and the preset metered resin quantity is injected. Thus, the variation in the weight of molded parts can be reduced.

Figure 4:
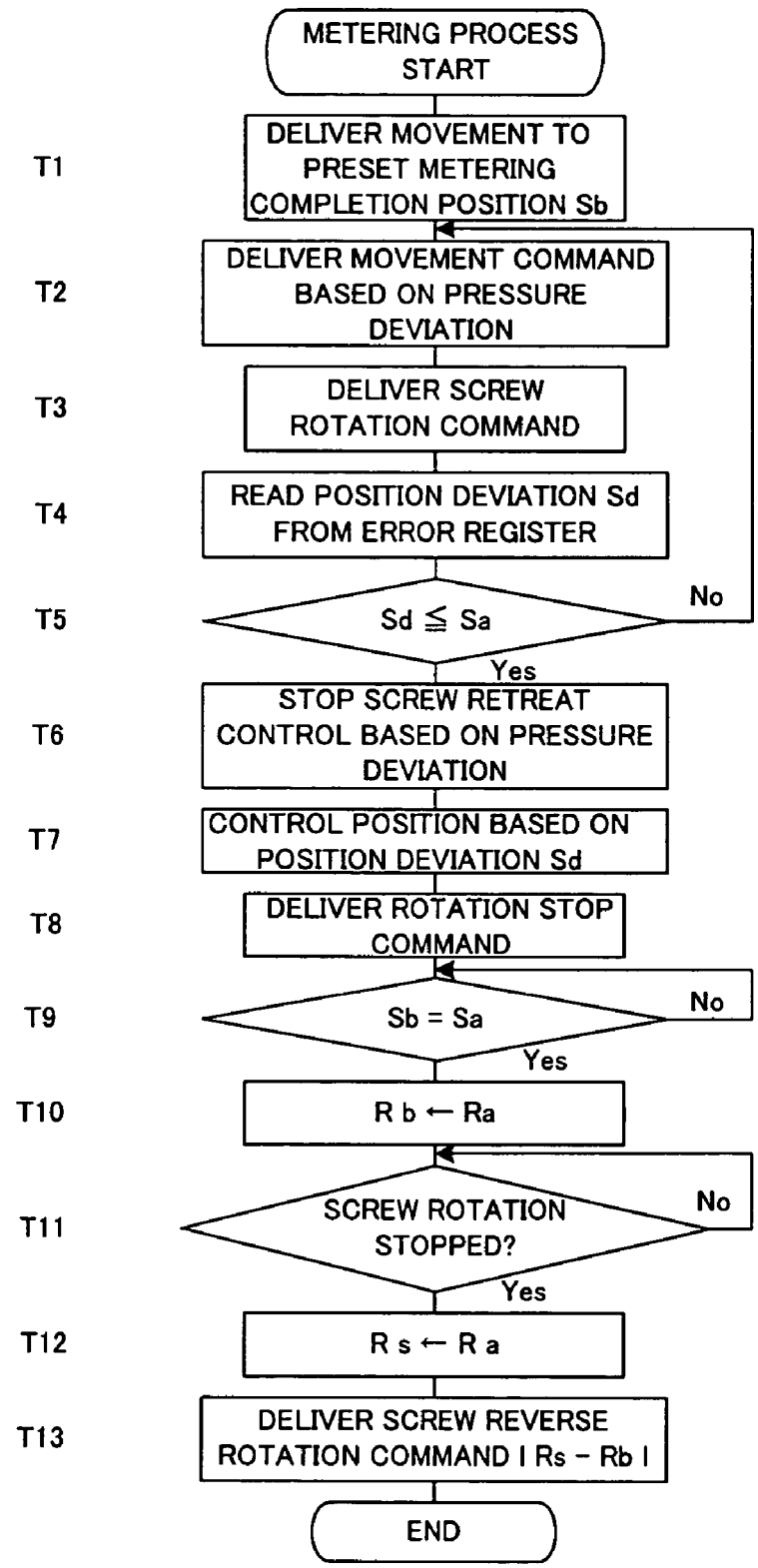
FIG. 4 is a flowchart illustrating operation according to one embodiment of the invention.

FIG. 4 is a flowchart showing the metering process the processor 26 of the control apparatus according to the present embodiment executes in accordance with the aforesaid principle of the invention.

When the metering process is started, the processor 26 delivers a movement for the retreat of the screw to the preset metering completion position Sb to the screw advancing and retreating servomotor M2 through the servo interface 22 (Step T1). This movement is loaded into an error register that is provided for position loop control in the servo amplifier 24.

Further, a resin pressure Pa that is detected by means of the pressure sensor (load cell) 9 through the A/D converter 20 is read, and a screw retreat command is obtained in accordance with a deviation between a preset resin pressure Ps and the detected resin pressure, and is delivered to the servo amplifier 24 through the servo interface 22 (Step T2). First, movement to the metering completion position Sb is loaded into the error register in the servo amplifier 24. However, the position loop control based on the position deviation stored in the error register is not carried out, and the screw advancing and retreating servomotor M2 is drivingly controlled in accordance with the movement command based on the pressure deviation.

Further, a command for the rotation of the screw at the preset rotating speed is delivered to the servo amplifier 23 through the servo interface 21 (Step T3).

On receiving the retreat command based on the pressure deviation, the servo amplifier 24 carries out speed feedback control in accordance with the retreat command and the speed information fed back from the speed detector P2, thereby moving the screw advancing and retreating servomotor M2. Thus, back pressure control based on feedback control of the resin pressure is carried out.

On receiving the screw rotation command, moreover, the servo amplifier 23 carries out speed feedback control in accordance with the commanded rotating speed and the speed information fed back from the position/speed detector P1, thereby rotating the screw rotating servomotor M1 at a preset speed.

Thus, the screw retreats as it carries out the pressure control and starts rotation at the preset rotating speed, as shown in FIGS. 3A and 3B, thereby melting and kneading the resin.

Then, the processor 26 subtracts the position information fed back from the position/speed detector P2, reads a value Sd of an error register that stores a current position deviation (Step T4), and compares it with the position deviation Ss that is set as a rotating speed regulation point and a switching point from the pressure control to the positioning control (Step T5).

If the read current position deviation Sd is greater than the preset position deviation Ss, the program returns to Step T2, whereupon the processes of Steps T2 to T5 are repeatedly executed so that the position deviation Sd is not greater than the preset position deviation Ss. Thereupon, the screw 3 retreats at the retreating speed based on the pressure deviation, as shown in FIG. 3A, and goes on rotating at the preset speed, as shown in FIG. 3B.

If the position deviation Sd is reduced to the preset position deviation Ss or less, the movement command based on the pressure deviation is stopped (or pressure feedback control is stopped). Then, the control mode is switched to the position loop control based on the position deviation (residual movement in the preset metering completion position Sb) stored in the error register, and the positioning control is started (Steps T6 and T7). Further, the rotation stop command (for stopping the speed command) is delivered to the servo amplifier 23 of the screw rotating servomotor M1 (Step T8). The preset position deviation Ss is previously obtained and set as a value corresponding to a movement from the start of deceleration to the stop, based on a previously measured screw retreating speed and the acceleration-deceleration time constant of the screw advancing and retreating servomotor M2. Alternatively, the actual screw retreating speed may be detected so that a movement required for the deceleration and stopping can be obtained in accordance with the detected retreating speed and the acceleration-deceleration time constant. In this case, this movement is automatically set as the position deviation Ss. In consequence, both the screw retreating speed and the screw rotating speed are reduced, as shown in FIGS. 3A and 3B.

Since the retreat of the screw is based on a positioning command for the preset metering completion position Sb, the screw is decelerated and located in the preset metering completion position Sb. If it is detected that the preset metering completion position Sb is reached by a current position Sa of the screw 3 (Step T9), therefore, the processor 26 reads a current rotational position Ra, which is obtained in accordance with the position information fed back from the position/speed detector P1, through the servo interface 21, and stores it as a screw rotational amount Rb at the end of the metering operation (Step T10).

If the rotation stop command is inputted so that the drive of the screw rotating servomotor M1 is stopped, as shown in FIG. 3, however, the screw 3 cannot immediately stop, owing to the respective inertias of the motor M1, screw 3, screw drive mechanism, etc., and overruns before it stops. If the processor 26 detects this stopping of the rotation of the screw 3 (Step T11), it detects the current rotational position Ra of the screw 3, and stores it as a screw rotational amount Rs obtained when the rotation of the screw 3 is stopped (Step T12).

The servo amplifier 23 is supplied with a rotation command for the rotation of the screw 3 for the difference between the screw rotational amount Rs obtained when the rotation of the screw 3 is stopped and the screw rotational amount Rb at the end of the metering operation, in the opposite rotating direction (reverse to the screw rotating direction for the metering process) at the preset rotating speed or the same speed as the rotating speed for metering. Thus, the screw rotating servomotor M1 is driven (Step T13), and the metering process is terminated.

After the metering operation is finished, as shown in FIG. 3, the screw 3 is rotated reversely by the amount Ab corresponding to the overrun rotational amount Aa. Thus, the surplus metered resin quantity that is attributable to the overrun of the screw 3 is corrected, so that the preset metered resin quantity can be obtained.

According to the embodiment described above, the screw rotational amount is detected by means of the position/speed detector that is connected to the servomotor. Alternatively, however, it may be detected by means of a detector that directly detects the rotational amount of the screw.

According to the embodiment described above, moreover, the rotational amount for the overrun is obtained from the difference between the screw rotational position Rb obtained in Step T10 at the end of the metering operation and the screw rotational position Rs obtained in Step T12 when the rotation of the screw is stopped. Alternatively, however, a counter for counting pulses may be provided if the position/speed detector P1 outputs the pulses. In this case, the counter is reset in Step T10, a counter value is read in Step T12, and the rotational amount for the overrun is obtained from the counter value. Further, the time interval from the completion of metering to the subsequent stop of screw rotation may be measured. In this case, the overrun is calculated on the basis of the measured time and the screw rotating speed, and the calculated value is regarded as a reverse rotational amount. In the operation shown in FIG. 4, in this case, moreover, a timer is started in Step T10, and the timer is stopped and the time before the deceleration is stopped is measured in Step T12. In Step T13, the reverse rotational amount is obtained from the measured time and the preset rotating speed and outputted.

If the overrun rotational amount Aa is previously given repetition stability, it may be preset as the reverse rotational amount Ab so that the screw can be reversely rotated by the preset amount Ab immediately after the screw rotation is decelerated and stopped. In the operation shown in FIG. 4, in this case, the processes of Steps T10 and T12 are unnecessary, and the process of Step T13 is a process for reverse rotation by the preset rotational amount Ab. Also in this case, a command speed for the reverse rotation may be automatically set according to the rotating speed for metering or may be set by an operator.

Although the present invention is applied to an in-line injection molding machine according to the embodiments described above, it may be also applied to a plunger-type injection molding machine. In this case, the screw advancing and retreating servomotor M2 serves as a plunger advancing and retreating motor, and a plunger advances and retreats by means of the plunger advancing and retreating motor. The screw is simply rotated by means of the screw rotating servomotor M1. Operation control for the metering process is carried out in like manner provided that the plunger advancing and retreating motor is drivingly controlled in place of the screw advancing and retreating servomotor M2. Although the present invention is applied to a motor-driven injection molding machine according to the foregoing embodiments, it may be also applied to a hydraulic injection molding machine.

According to the present invention, the surplus metered resin quantity that is attributable to overrun such that the screw rotates after the end of the metering operation, owing to the respective inertias of the screw, screw rotation drive mechanism, etc., can be corrected, so that a more accurate preset metered resin quantity can be obtained. In consequence, molded parts can be equalized in weight, and stable molding can be enjoyed.

What is claimed is:

1. A metering method for an injection molding machine, comprising:
    obtaining a screw rotational amount after a screw or a plunger retreats up to a preset metering completion position; and
    reversely rotating the screw by the obtained rotational amount after the rotation of the screw is stopped.

2. A metering method for an injection molding machine, comprising:
    delivering a screw rotation stop command to screw rotation drive means when a screw or a plunger stops after retreating and reaching a preset metering completion position, and measuring the rotational amount of the screw thereafter, the rotational amount of the screw being >0; and
    reversely rotating the screw by the measured rotational amount after the stop of the screw rotation.

3. A metering method for an injection molding machine, comprising:
    delivering a screw rotation stop command to screw rotation drive means when a screw or a plunger stops after retreating and reaching a preset metering completion position, and measuring and storing the rotational amount of the screw thereafter, the rotational amount of the screw being >0; and
    delivering the screw rotation stop command to the screw rotation drive means when the screw or the plunger stops after retreating and reaching the preset metering completion position, in a subsequent metering process, and reversely rotating the screw by the stored rotational amount after the rotation of the screw is stopped.

* * * * *